Figure 1:
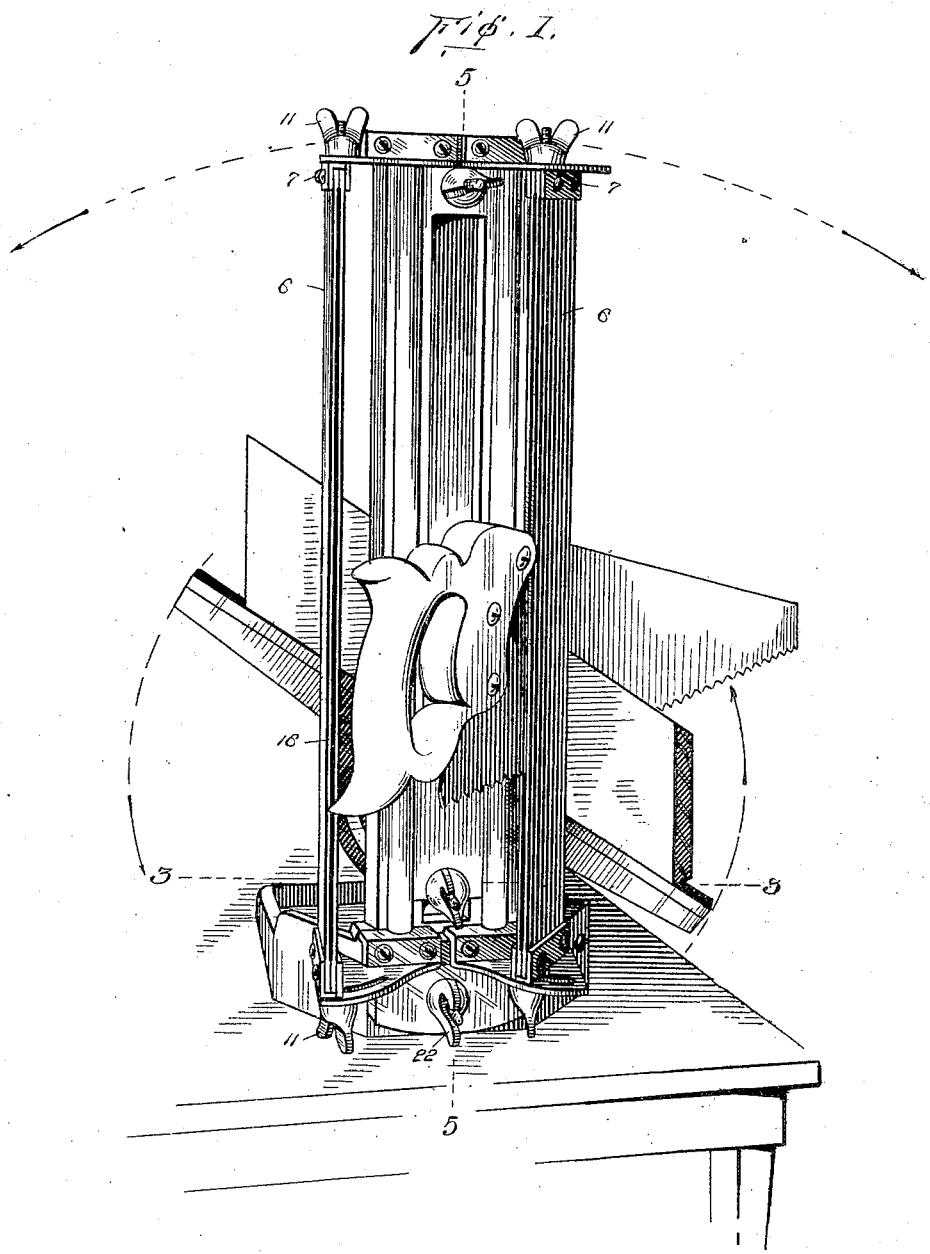

No. 688,879.　　　　　　　　　　　　　Patented Dec. 17, 1901.
B. H. OTIS.
MITER BOX.
(Application filed Mar. 28, 1901.)

(No Model.)　　　　　　　　　　　　　　　3 Sheets—Sheet 1.

Witnesses　　　　　　　　　　　　　　　Inventor
　　　　　　　　　　　　　　　　　　　　B. H. Otis,
　　　　　　　　　　　　　　　　　　By Victor J. Evans
　　　　　　　　　　　　　　　　　　　　　Attorney No. 688,879. Patented Dec. 17, 1901.
B. H. OTIS.
MITER BOX.
(Application filed Mar. 28, 1901.)
(No Model.) 3 Sheets—Sheet 2.
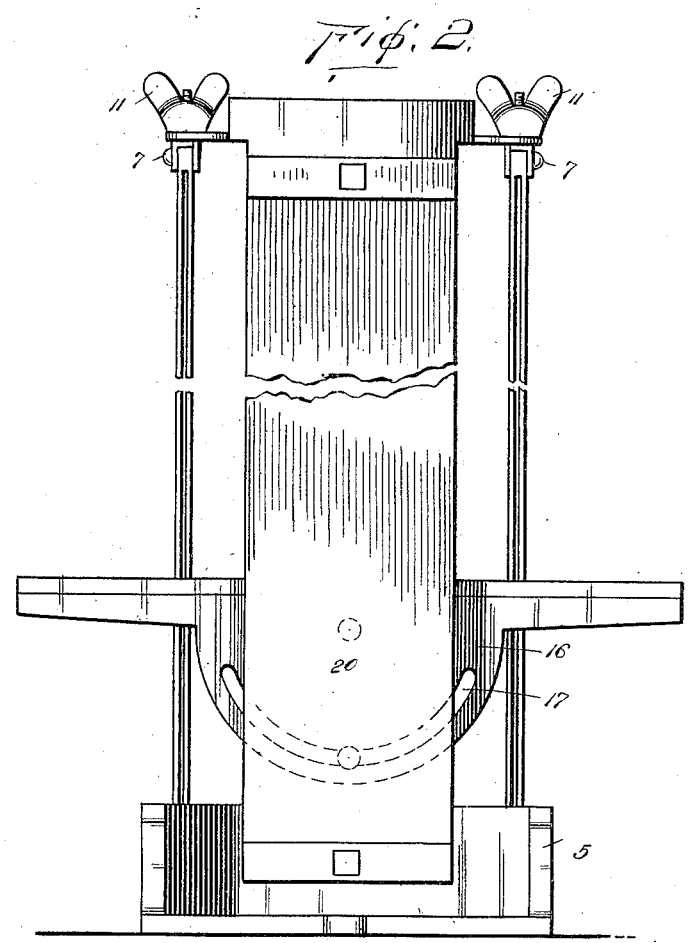
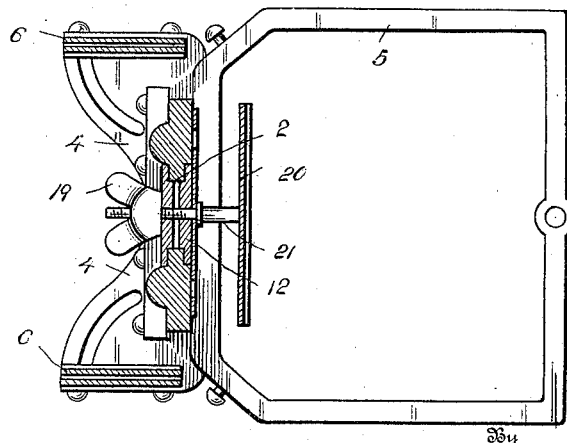

No. 688,879.
B. H. OTIS.
MITER BOX.
(Application filed Mar. 28, 1901.)
Patented Dec. 17, 1901.
(No Model.)
3 Sheets—Sheet 3.
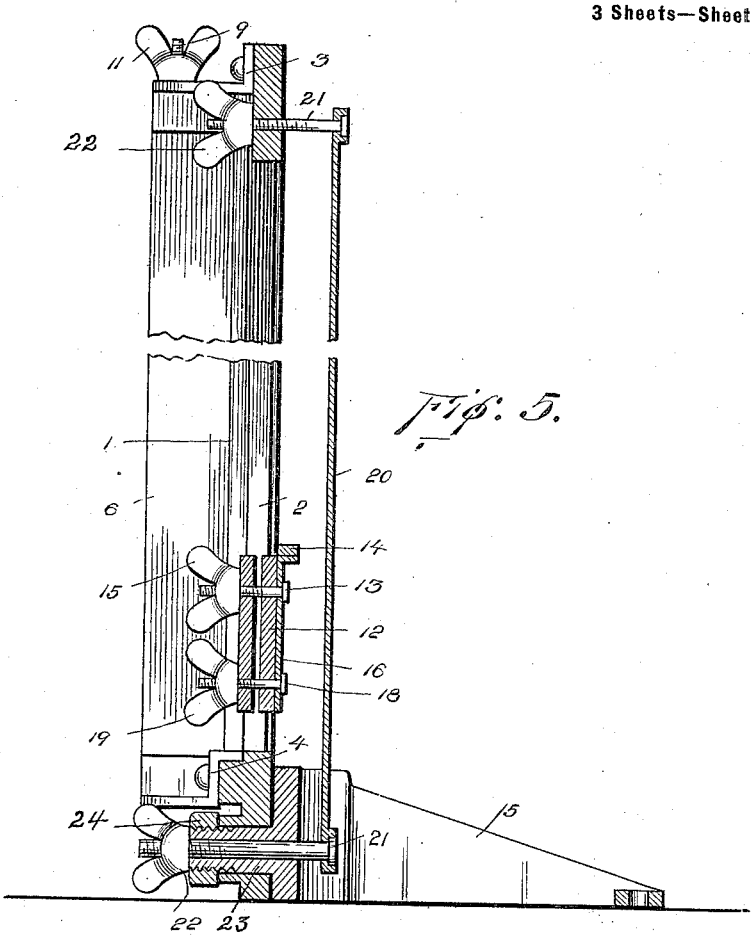
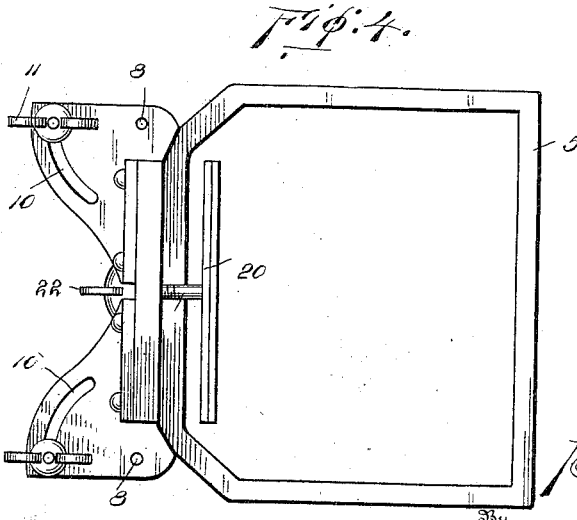
Witnesses
Inventor
B. H. Otis,
By Victor J. Evans
Attorney

UNITED STATES PATENT OFFICE.

BENJAMIN H. OTIS, OF PERRIS, CALIFORNIA, ASSIGNOR OF ONE-HALF TO AUGUSTA C. A. SIGAFUS, OF PERRIS, CALIFORNIA.

MITER-BOX.

SPECIFICATION forming part of Letters Patent No. 688,879, dated December 17, 1901.

Application filed March 28, 1901. Serial No. 53,243. (No model.)

*To all whom it may concern:*

Be it known that I, BENJAMIN H. OTIS, a citizen of the United States, residing at Perris, in the county of Riverside and State of California, have invented new and useful Improvements in Miter-Boxes, of which the following is a specification.

This invention relates to new and useful improvements in miter-boxes; and its primary object is to provide a device of simple construction whereby one or two bevels may be cut upon a strip of wood or other material at one and the same operation.

A further object is to provide means of novel construction for holding the saw at a desired angle and for supporting the work at the proper inclination to the cutting edge of the saw.

Another object is to provide means whereby the work may be securely clamped in adjusted position.

With these and other objects in view the invention consists in providing a slotted casting, to the ends of which plates are secured in any suitable manner and between which are pivoted parallel guide-strips which are adapted to receive the saw and guide the same in its longitudinal movement. Means are provided whereby these guide-strips may be adjusted at the desired angle to the work. A block is slidably mounted within the slot of the casting, and pivoted to the upper end of this block is a supporting-strip which is adapted to hold the work. A slotted plate extends downward from this strip and is adapted to be engaged by a bolt extending through the sliding block and provided with means whereby said plate may be locked against movement at any desired point, thereby holding the supporting-strip at a suitable inclination. Means are also employed whereby the work will be securely held in position upon the supporting-plate, and these comprise a longitudinally-extending strip arranged along the face of the miter-box and provided with adjusting means at each end, whereby said strip may be clamped upon the work.

The invention also consists in the novel construction and combination of parts hereinafter more fully described and claimed, and illustrated in the accompanying drawings, showing the preferred form of my invention, and in which—

Figure 1 is a perspective view of the device. Fig. 2 is an elevation of the work-holding side of the device. Fig. 3 is a section on line 3 3 of Fig. 1. Fig. 4 is a top plan view, and Fig. 5 is a section on line 5 5 of Fig. 1.

Referring to the figures by numerals of reference, 1 is the body of the device, preferably formed of a casting of any desired length and having a longitudinally-extending slot 2 therein. To the upper end of this casting is secured an angular plate 3, and a substantially similar plate 4 is arranged adjacent to the lower end, the bottom of the casting being provided with a loop or yoke 5. The upper and lower plates 3 and 4 extend laterally from the casting 1, and mounted therebetween are longitudinally-extending guide-strips 6, which are arranged in pairs, one pair being provided at each side of the casting. The strips of each pair are spaced apart a sufficient distance to permit of the insertion of a saw-blade therebetween, and any desired means, as bolts 7, are provided, whereby the strips of each pair are secured together at their ends. Each pair of guide-strips is provided at its forward edge with studs 8, which bear within the plates 3 and 4 and serve as bearings for the guide-strips, thereby permitting the same to swing upon the studs.

Threaded stems 9 extend from the ends of each pair of guide-strips and are adapted to travel within curved slots 10, formed within the plates 3 and 4, and thumb-nuts 11 are mounted upon the stems 9, whereby the guide-strips can be firmly secured in any position to which they may be swung.

Fitted within the slot 2, before referred to, is a sliding block 12, formed, preferably, in two parts, which are adapted to overlap the opposite sides of the edges of the slot and which receive a bolt 13, which extends laterally from a work-supporting strip 14 and is adapted to be engaged by a thumb-nut 15. It will be understood that when this nut is turned inward upon the bolt 13 it will clamp the sections of the sliding block together and support the strip 14 in adjusted position.

A semicircular plate 16 extends downward from the supporting-strip 14 and is concentric to the pivot of said strip. This plate is provided with a curved slot 17, which is adapted to receive a bolt 18, which is also fitted within the block 12 and which is provided with means, such as a thumb-nut 19, whereby said plate may be clamped in any position to which it may be moved. It will be seen that by this arrangement the supporting-strip 14 may be adjusted to any desired point upon the face of the miter-box and may also be adjusted to a desired inclination.

A strip 20 extends longitudinally along the face of the miter-box at the outer edge of the supporting-plate, and this strip is provided at each end with laterally-extending threaded bolts 21, which project through the casting 1 of the box, at the ends thereof, and which are provided with thumb-nuts 22, whereby the strip 20 may be drawn inward and firmly clamped upon the work after the same has once been placed in position upon the supporting-plate.

When it is desired to cut a single bevel upon a piece of lumber, the same is placed upon the supporting-strip and in rear of the plate 20. The thumb-nuts 22 are then screwed upon the bolts 21, causing the strip 20 to clamp the work upon the face of the miter-box. A saw-blade is then placed within one set or pair of guide-strips 6, and said set is locked, by means of the nuts 11, at the desired angle to the work. When it is desired to cut a double bevel, the supporting-strip 14 is set at a desired inclination and the operation above described is then repeated. The yoke 5, arranged at the base of the miter-box, serves to support the same in an upright position. It will be seen that the device is extremely simple and durable in construction and that accurate work may be done therewith. The yoke 5 is provided with a threaded stem 23, which extends through the lower end of the casting 1 and is engaged by a nut 24. By securing the yoke 5 to the casting in this manner the same may be moved in the direction of the arrows in Fig. 1 and locked in any position to which it is adjusted. The bolt 21 preferably extends through the stem 23, as shown in Fig. 5.

In the foregoing description I have shown the preferred form of my invention; but I do not limit myself thereto, as I am aware that modifications may be made therein without departing from the spirit or sacrificing any of the advantages thereof, and I therefore reserve the right to make all such changes as fairly fall within the scope of my invention.

Having thus fully described my invention, what I claim as new, and desire to secure by Letters Patent, is—

1. The combination with a body provided with a longitudinal slot, of horizontal plates secured to the top and bottom of the body and formed with curved slots, parallel guide-strips pivotally secured between said plates, a block slidably mounted within said longitudinal slot, a work-supporting strip pivoted to said block, and means for securing said guides, block, and strip, at different adjustments.

2. The combination with a body provided with a longitudinal slot, of plates projecting horizontally from the body and formed with curved slots, parallel saw-guides pivotally secured between said plates, a block slidably mounted within the slot in the body and comprising two plates overlapping the walls of the slots, and bolts connecting said plates, a work-supporting strip pivoted to said block, means for securing said guides, block, and strip at different adjustments, and a clamping-strip extending longitudinally of the body and provided with bolts extending through the body.

3. The combination with a body provided with a longitudinal slot, of parallel horizontal plates at the upper and lower ends of the body, formed with curved slots, parallel guides pivotally secured between the plates and provided with threaded stems extending through the curved slots in the plates; securing-nuts on said stems, a block slidably mounted within the slot in the body, a work-supporting strip pivotally secured to said block and having a semicircular plate extension, a strip extending longitudinally of the body, clamping-bolts secured to the strip and extending through the body, and nuts on said bolts.

4. The combination with a body provided with a longitudinal slot, of parallel horizontal plates projecting from the top and bottom of the body, pivoted guides between said plates, a block slidably mounted within said slot, a work-supporting strip pivotally secured to said block, a clamping-strip adjustably secured to the body, and a yoke provided with a threaded stem extending through the lower portion of the body, and a nut engaging said stem.

5. The combination with a body having a longitudinally-extending slot therein, of a block slidably mounted within the slot, a supporting-strip pivoted to said block, means for locking the block in adjusted position, within the slot, a plate extending from the supporting-strip and having a curved slot, a bolt within the sliding block adapted to engage said slot and hold the supporting-strip at a desired inclination, a strip extending longitudinally of the body, means for adjusting said strip from and toward said body, guides pivoted to the body and extending longitudinally thereof, and means for locking the guides at a desired angle to the supporting-strip.

In testimony whereof I affix my signature in presence of two witnesses.

BENJAMIN H. OTIS.

Witnesses:
S. V. GATES,
JAMES M. SIGAFUS.